(12) United States Patent
Rakhmailov

(10) Patent No.: US 6,460,343 B1
(45) Date of Patent: Oct. 8, 2002

(54) GAS TURBINE ENGINE

(75) Inventor: Anatoly Rakhmailov, Bataysk (RU)

(73) Assignee: ALM Development, Inc., Washington, DC (US)

( * ) Notice: Subject to any disclaimer, the term of this patent is extended or adjusted under 35 U.S.C. 154(b) by 0 days.

(21) Appl. No.: 09/161,104

(22) Filed: Sep. 25, 1998

(51) Int. Cl.[7] .............................. F02C 7/08; F02C 7/18; F02K 3/50
(52) U.S. Cl. .............................. 60/776; 60/804; 60/806
(58) Field of Search .............................. 60/39.06, 39.36, 60/760, 39.75, 737, 738, 776, 804, 805, 806, 782

(56) References Cited

U.S. PATENT DOCUMENTS

| | | |
|---|---|---|
| 1,388,707 A | 8/1921 | Heinze |
| 1,868,143 A | 7/1932 | Heinz |
| 2,303,381 A | 12/1942 | New |
| 2,579,049 A | 12/1951 | Price |
| 2,784,551 A | 3/1957 | Karlby et al. |
| 2,821,067 A | 1/1958 | Hill |
| 2,823,520 A | 2/1958 | Spalding |
| 3,280,555 A | 10/1966 | Charpentier et al. |
| 3,287,904 A | 11/1966 | Warren et al. |
| 3,469,396 A | 9/1969 | Onishi et al. |
| 3,727,401 A | 4/1973 | Fincher |
| 3,751,911 A | 8/1973 | De Tartaglia |
| 3,775,974 A | 12/1973 | Silver |
| 3,826,084 A | 7/1974 | Branstrom et al. |
| 3,886,732 A | 6/1975 | Gamell |
| 3,971,209 A | 7/1976 | de Chair |
| 4,024,705 A | 5/1977 | Hedrick |
| 4,151,709 A * | 5/1979 | Melconian et al. ........ 60/39.36 |
| 4,277,938 A | 7/1981 | Belke et al. |
| 4,338,780 A | 7/1982 | Sakamoto et al. |
| 4,338,781 A | 7/1982 | Belke et al. |
| 4,549,402 A | 10/1985 | Saintsbury et al. |
| 4,845,941 A * | 7/1989 | Paul .......................... 60/39.06 |
| 4,991,391 A | 2/1991 | Kosinski |
| 5,003,766 A * | 4/1991 | Paul ...................... 60/39.36 X |
| 5,054,279 A | 10/1991 | Hines |
| 5,174,108 A * | 12/1992 | Shekleton .................. 60/39.36 |
| 5,280,703 A * | 1/1994 | Corrado et al. ............ 60/39.36 |
| 5,473,881 A | 12/1995 | Kramnik et al. |
| 5,727,378 A * | 3/1998 | Seymour .................... 60/39.36 |

FOREIGN PATENT DOCUMENTS

| | | |
|---|---|---|
| DE | 2332698 | 1/1974 |
| DE | 2335594 | 8/1974 |
| DE | 2437990 | 2/1976 |
| DE | 3713923 | 11/1987 |
| DE | 2018641 | 10/1991 |
| FR | 77 09399 | 10/1978 |
| GB | 196452 | 4/1923 |
| GB | 753652 | 7/1956 |
| GB | 801281 | 9/1958 |
| GB | 803994 | 11/1958 |
| GB | 1435687 | 5/1976 |
| JP | 11159345 | 6/1999 |
| RU | 4863 506/06 | 6/1992 |
| RU | 2050455 | 12/1995 |

\* cited by examiner

Primary Examiner—Ted Kim
(74) Attorney, Agent, or Firm—Hughes Hubbard & Reed, LLP; Ronald Abramson; Peter A. Sullivan

(57) ABSTRACT

A gas turbine engine has a device for admitting a rotating fluid flow from an annular space of the casing to the inlet portion of a combustor to form a rotating fluid flow in the inlet portion of the combustor. The rotating fluid flow is formed in the annular space of the casing by supplying a fluid from a compressor to the blades of the turbine rotor disk.

8 Claims, 2 Drawing Sheets

GAS TURBINE ENGINE

This application cross-references three copending U.S. patent applications, each of which was filed on Sep. 25, 1998, as U.S. patent application Ser. Nos. 09/161,114, 09/161,115 and 09/161,170, respectively, each of which copending U.S. applications is incorporated herein by reference.

The invention relates to the field of gas turbine engines, and more specifically, to an improved gas turbine engine using a rotating fluid flow train to feed the combustor and enhance air/fuel mixing and emissions.

BACKGROUND OF THE INVENTION

A type of prior art gas turbine engine has a compressor, a fuel source, a combustion air source, a casing, and a combustor to prepare a heated fluid from fuel and combustion air. The combustor is connected to the fuel source, the combustion air source and the compressor. Practically the entire fluid flow from the compressor is directed to the combustor. The engine has a turbine rotor disk with blades that receive the heated fluid from the combustor. As the turbine rotor disk rotates during engine operation, the heated fluid flow coming from the combustor has to be directed at an angle to the blades to ensure smooth entry conditions. This is done using stator vanes that are positioned at a certain angle and direct the heated fluid from the combustor to the turbine rotor disk in a manner compatible with rotor disk rotation. This gas turbine engine is disclosed in U.S. Pat. No. 3,826,084 to Branstrom et al.

The stator vane angle normally is chosen to accommodate the most optimum and prevailing turbine rotor disk operating conditions (speed). This solution is quite acceptable for gas turbine engines that have more or less stable operating conditions, such as when used for power generation. In applications where the load upon the gas turbine engine is steady, the turbine rotor disk rotates at a stable speed, and the entry angle for the blades remains unchanged thus minimizing losses. If, on the other hand, this gas turbine engine is used to power a vehicle, the situation is radically different. In that application, the turbine rotor disk speed will vary within a broad range depending on vehicle load. Consequently, the entry angle also varies within a broad range under load fluctuations, which leads to greater losses. This problem could not be solved by using the conventional approach with the stator vanes. It is possible to use controllable stator vanes to change the entry angle at the blades, but it is a very complicated and expensive solution given the high temperatures downstream of the combustor and space limitations. As a result, the gas turbine engine would have high losses in vehicle applications. Moreover, the stator and vanes occupies an additional space and makes the engine design more complicated and expensive. The use of controllable vanes makes the engine less reliable.

The problems indicated above are solved in the gas turbine engine of this invention.

SUMMARY OF THE INVENTION

It is an object of the invention to provide a gas turbine engine of the above type that has a higher efficiency.

Another object of the invention is to provide a more compact gas turbine engine that has a simpler design.

Another object of the invention is to improve the emission characteristics of the gas turbine engine.

A gas turbine engine has a device to admit a rotating fluid flow from an annular space in the casing to the inlet portion of a combustor to form a rotating fluid flow in the inlet portion of the combustor. The rotating fluid flow is formed in the annular space of the casing by supplying a fluid from a compressor to the blades of the turbine rotor disk.

Other objects and advantages of the invention will become apparent from the following detailed description of preferred embodiments and accompanying drawings.

DETAILED DESCRIPTION OF THE DRAWINGS

Figure 1:
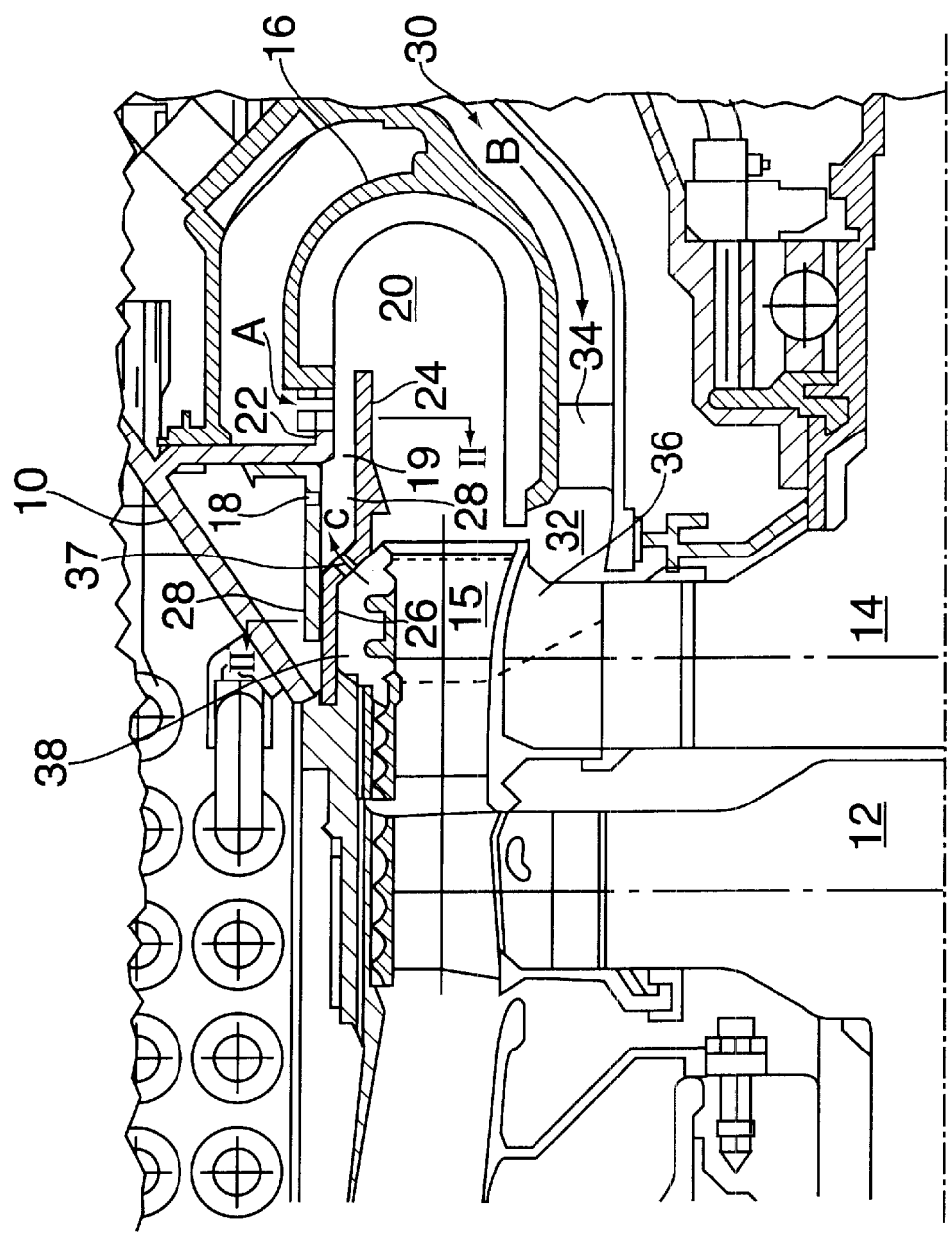
FIG. 1 shows a diagrammatic view of a gas turbine engine according to the invention.

With reference to FIG. 1, a gas turbine engine has a casing 10, a compressor 12 for supplying a compressed fluid, a turbine rotor disk 14 mounted downstream of compressor 12 installed on the turbine rotor such that the compressor 12 and the turbine rotor disk 14 lie on the same rotational axis, a combustor 16 to prepare a heated fluid to be supplied to turbine rotor disk 14. Combustor 16 has a port 18 to admit fuel supplied from a fuel source (not shown). Combustor 16 defines a combustion zone 20 in which the heated fluid is formed. Combustion air is supplied from an air source (not shown) as shown by arrows A to an inlet portion of the combustor in which port 18 is provided.

The inlet portion of the combustor shown at 19 is defined by an inner annular wall 22 of combustor 16 and by an annular guide wall 24 that extends within the combustor in a spaced relation to annular inner wall 22. Annular guide wall 24 is installed by brackets 26 to casing inner wall in such a manner that an annular space 38 and an inlet portion 19 is left for fluid passage.

A part of the fluid from compressor 12 is supplied to turbine rotor disk 14, bypassing combustor 16, as shown by arrows B, through passage 30 in casing 10 and reaching a zone 32 upstream of turbine rotor disk 14. The flow path from compressor 12 to passage 30 may be implemented in various ways by one of ordinary skill in the art. An embodiment of such a flow path may be found, for example, in U.S. patent application number 09/161,115 to Rakhmailov, cross-reference and incorporated herein by reference. Vanes 34 can be provided in passage 30 to make this fluid flow compatible with the turbine rotor disk 14 rotation. These vanes will function in an optimum manner only under certain turbine engine operating conditions. Since the quantity of fluid that is fed to the turbine rotor disk 14 and the velocity of this fluid are not very high, losses that would occur under non-optimum conditions would be relatively low. This fluid is admitted to turbine rotor disk 14 and envelops the blades 15. The fluid from the compressor 12 passes through a passage 36 of the blade 15 and leaves the passage 36 to reach an annular space 38 that is defined in casing 10 and surrounds blades 15. As the blades 15 rotate, the fluid from the compressor 12 leaves blade passage 36 having obtained a rotation that forms a rotating fluid flow in annular space 38. This rotating fluid flow is admitted from annular space 38 through port 37 to inlet portion 19 (as shown by arrow C) of combustor 16 to form a rotating fluid flow there. As fuel is fed through port 18, it is entrained in a rotary motion by the rotating fluid flow in the inlet portion 19, and intense stirring and mixing of fuel and fluid will take place to prepare a good quality fuel mixture. The rotating fluid flow entrains air that is fed as shown by arrow A, moves into combustion zone 20, and imparts a spin to the heated fluid when it is formed in combustion zone 20. The direction of this rotating flow is the same as the turbine rotor disk direction of rotation and the velocity of this rotating flow steadily follows turbine rotor disk 14 rotation velocity (with a very short lag). The heated fluid formed in combustor 16 will move to the turbine blades 15 in a manner that is almost entirely compatible with rotation of the turbine rotor disk. Consequently, losses in this zone, which account for most of the losses in the turbine flow duct, are minimized.

Another advantage of the invention is that the fluid from the compressor that goes through passage 36 and reaches blade 15 cools the blade and the adjacent wall of casing 10.

The intensive mixing and stirring of fuel, air, and the fluid that comes from the compressor in inlet portion 19 provides almost ideal conditions to prepare a fuel mixture. This high quality fuel mixture provides better conditions for combustion and improves the emission characteristics of the engine.

Another advantage of the invention is the method of preparation of the fuel mixture. The quantity of fuel supplied for small-power gas turbine engines is rather low. It is very difficult to prepare a homogeneous fuel mixture with a ratio of fuel to air and fluid of 1:15 to 1:30. The fuel mixing method that is used here solves this problem. When fuel is entrained in a rotary motion by the rotating fluid flow admitted to the inlet portion of the combustor, fuel atomizing, mixing and stirring in the rotating flow are very thorough and intensive. This thoroughness assures a high degree of homogeneity of the fuel mixture.

Figure 2A:
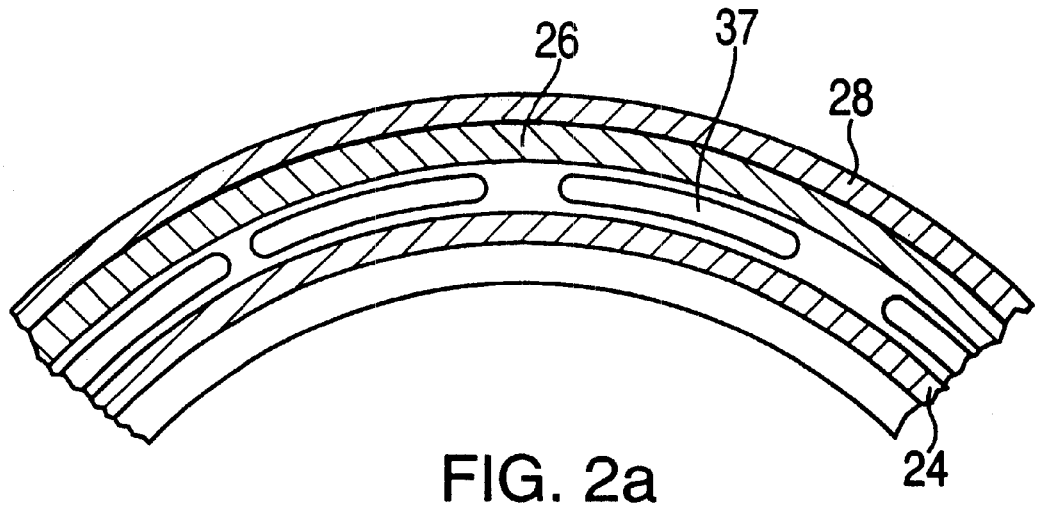
FIGS. 2a and 2b are sectional views of embodiments of the annular space and inlet portion according to the invention.
Figure 2B:
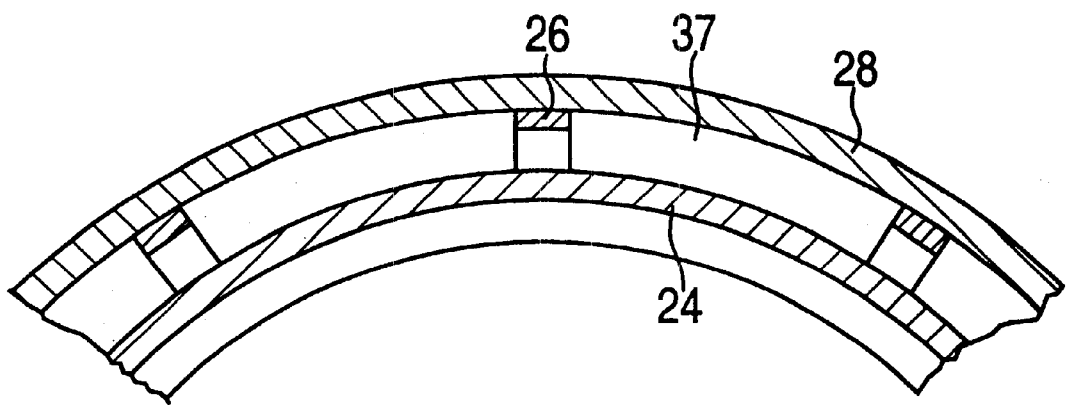

FIGS. 2a and 2b show embodiments of the port 37 and inlet portion 19 with annular guide walls 24 attached by brackets 26 to casing inner wall 28. This port 37 can take the form of an arc slit cut in a flanged portion of the annular guide wall (FIG. 2a) or in the form of spaces between the adjacent brackets (FIG. 2b).

I claim:

1. A method of operation of a gas turbine engine having a compressor for producing a fluid flow, a casing, a combustor in said casing, said combustor having an inlet portion, a turbine rotor disk with blades, and an annular space in said casing, said annular space surrounding said blades, said method comprising:

supplying fuel and combustion air to said combustor to prepare a heated fluid;

supplying said heated fluid directly from said combustor to said blades;

supplying said fluid flow from said compressor to said blades to form a rotating fluid flow in said annular space;

feeding at least a part of said rotating fluid flow into said inlet portion of said combustor.

2. The method of claim 1, wherein said fuel is supplied into said rotating fluid flow within said inlet portion of said combustor.

3. A method of operation of a gas turbine engine having a compressor for producing a fluid flow, a casing, a combustor in said casing, said combustor having an inlet portion, a turbine rotor disk with blades, and an annular space in said casing, said annular space surrounding said blades, said method comprising:

supplying said fluid flow from said compressor to said blades to form a rotating fluid flow in said annular space;

feeding at least a part of said rotating fluid flow into said inlet portion of said combustor;

feeding said fuel into said rotating fluid flow within said inlet portion of said combustor preparing a heated fluid in said combustor by burning said fuel and air in said combustor;

supplying said heated fluid directly from said combustor to said blades.

4. A gas turbine engine, said gas turbine engine comprising:

a compressor for producing a fluid flow;

a fuel source;

a combustion air source;

a casing;

a combustor in said casing, said combustor having an annular inner wall and an inlet portion, said combustor communicating with said fuel source and with said combustion air source to prepare a heated fluid;

a turbine rotor disk with blades, said blades positioned immediately downstream of said combustor for receiving said heated fluid from said combustor;

an annular space in said casing, said annular space surrounding said blades;

a zone upstream of said turbine rotor disk, said zone communicating with said compressor for supplying said fluid flow from said compressor to said blades to form a rotating fluid flow in said annular space;

a means for admitting said rotating fluid flow from said annular space to said inlet portion of said combustor, whereby a rotating fluid flow is formed in said inlet portion of said combustor.

5. The gas turbine engine of claim 4, wherein said fuel source communicates with said inlet portion of said combustor.

6. The gas turbine engine of claim 4, wherein said means for admitting said rotating fluid flow from said annular space to said inlet portion of said combustor comprises:

an annular guide wall that is installed in said combustor in a spaced relation to said annular inner wall of said combustor, said annular guide wall defining with said annular inner wall of said combustor said inlet portion of said combustor;

said inlet portion of said combustor communicating with said annular space of said casing.

7. The gas turbine engine of claim 6, wherein said fuel source communicates with said inlet portion of said combustor.

8. A gas turbine engine, said gas turbine engine comprising:
- a compressor for producing a fluid flow;
- a fuel source;
- a combustion air source;
- a casing;
- a combustor in said casing, said combustor having an annular inner wall and an inlet portion, said combustor communicating with said combustion air source to prepare a heated fluid by burning said fuel with said combustion air;
- a turbine rotor disk with blades, said blades positioned immediately downstream of said combustor for receiving said heated fluid from said combustor;
- an annular space in said casing, said annular space surrounding said blades;
- a zone upstream of said turbine rotor disk, said zone communicating with said compressor for supplying said fluid flow from said compressor to said blades to form a rotating fluid flow in said annular space;
- an annular guide wall that is installed in said combustor in a spaced relation to said annular inner wall of said combustor, said annular guide wall defining with said annular inner wall of said combustor said inlet portion of said combustor;
- said inlet portion of said combustor communicating with said annular space of said casing; said fuel source communicates with said inlet portion of said combustor.

* * * * *